United States Patent
Naim et al.

(10) Patent No.: US 9,320,058 B1
(45) Date of Patent: Apr. 19, 2016

(54) USE OF SPECIAL RANDOM ACCESS CHANNEL INSTANCES FOR ACCESS REQUEST INTERCEPTION AND FORWARDING

(71) Applicant: Sprint Spectrum L.P., Overland Park, KS (US)

(72) Inventors: Muhammad A. Naim, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 121 days.

(21) Appl. No.: 14/258,801

(22) Filed: Apr. 22, 2014

(51) Int. Cl.
*H04W 74/08* (2009.01)

(52) U.S. Cl.
CPC .................................. *H04W 74/0833* (2013.01)

(58) Field of Classification Search
None
See application file for complete search history.

(56) References Cited

U.S. PATENT DOCUMENTS

| | | | |
|---|---|---|---|
| 2008/0285499 A1 | 11/2008 | Zhang et al. | |
| 2009/0042582 A1 | 2/2009 | Wang et al. | |
| 2009/0176492 A1* | 7/2009 | Kwon | H04B 7/026 455/436 |
| 2009/0262652 A1* | 10/2009 | Tourolle | H04L 45/26 370/248 |
| 2010/0150103 A1 | 6/2010 | Womack et al. | |
| 2011/0105121 A1* | 5/2011 | Kazmi | H04W 36/30 455/436 |
| 2012/0077507 A1 | 3/2012 | Lee | |
| 2012/0115467 A1* | 5/2012 | Conte | H04W 52/0225 455/434 |
| 2014/0112254 A1* | 4/2014 | Lindoff | H04W 74/002 370/328 |
| 2014/0161024 A1* | 6/2014 | Speight | H04W 74/0833 370/315 |
| 2014/0241236 A1* | 8/2014 | Speight | H04W 52/46 370/315 |
| 2014/0241237 A1* | 8/2014 | Speight | H04W 52/46 370/315 |

* cited by examiner

*Primary Examiner* — Gary Mui

(57) ABSTRACT

One or more random access channel (RACH) instances may be specially designated for use by mobile terminals that are in threshold poor coverage of an intended base station. Further, one or more other base stations that provide coverage overlapping with, within, or near coverage of the intended base station may be arranged to monitor the one or more specially designated RACH instances for mobile terminal access requests and, upon detecting any such access request, to forward the access request via an inter-base station link to the intended base station. The intended base station may then respond to the mobile terminal access request through a direct downlink communication to the mobile terminal.

19 Claims, 5 Drawing Sheets

USE OF SPECIAL RANDOM ACCESS CHANNEL INSTANCES FOR ACCESS REQUEST INTERCEPTION AND FORWARDING

BACKGROUND

Unless otherwise indicated herein, the materials described in this section are not prior art to the claims and are not admitted to be prior art by inclusion in this section.

A typical cellular wireless network includes a number of base stations each radiating to define a respective coverage area in which mobile terminals such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a mobile terminal within coverage of the network may engage in air interface communication with a base station and may thereby communicate via the base station with various remote network entities or with other mobile terminals served by the base station.

Further, a cellular wireless network may operate in accordance with a particular air interface protocol or "radio access technology," with communications from the base stations to mobile terminals defining a downlink or forward link and communications from the mobile terminals to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of mobile terminals, initiation of communications, handover of between coverage areas, and other functions related to air interface communication.

In accordance with the air interface protocol, each coverage area may operate on one or more carrier frequencies or range of carrier frequencies. Further, each coverage area may define a number of channels or specific resources for carrying signals and information between the base station and mobile terminals. For instance, certain resources on the downlink may be reserved to carry a pilot or reference signal that mobile terminals may detect as an indication of coverage and may measure to evaluate coverage quality. Further, certain resources on the uplink may be reserved to carry access requests from mobile terminals seeking to gain access to the base station. And certain resources on the downlink may be reserved to carry control messaging such as paging messages and random access response messages from the base station. In addition, certain resources on the uplink and downlink may be set aside to carry bearer traffic (e.g., user communications) in a manner assigned or scheduled by the base station for instance.

When a mobile terminal is within coverage of a base station, the mobile terminal may from time to time transmit to the base station an access request message. The purpose of such an access request message may depend on the air interface protocol and the circumstances. By way of example, a mobile terminal may transmit an access request as a request to gain initial access to communicate with a base station, such as to transition from an idle state to a connected state for instance or to facilitate handover to the base station. As another example, a mobile terminal may transmit an access request as a response to a page message and/or as a request to establish a particular communication connection such as a call or data session. As still another example, a mobile terminal may transmit an access request to register or reregister with a base station and/or to provide a location or tracking area update. And as still another example, a mobile terminal may transmit an access request to provide the base station with timing advance information or the like, to facilitate positioning.

Once the base station receives a mobile terminal's access request, perhaps after further processing by the base station and/or associated infrastructure, the base station may then transmit an access response message to the mobile terminal.

OVERVIEW

In practice, a typical cellular base station may operate with fairly high downlink transmission power, to facilitate providing a wide range of coverage. However, mobile terminals are typically battery powered and therefore tend to operate with much lower uplink transmission power. As a result of this disparity in transmission power, a situation can arise where a mobile terminal is located in poor but seemingly adequate coverage of a base station and the mobile terminal transmits an access request message to the base station, but the base station does not receive the access request due to insufficient uplink transmission power. When this happens, the mobile terminal would not receive a response from the base station and the mobile terminal may therefore engage in another access request transmission attempt, perhaps using somewhat higher uplink transmission power. Further, the mobile terminal may repeat this process a number of times until either receiving a response from the base station or concluding that the access effort failed.

Disclosed herein is an innovative arrangement to help overcome this problem, and particularly to convey a mobile terminal's access request to an intended base station in a scenario where the mobile terminal is in threshold poor coverage of the intended base station. In accordance with the disclosure, one or more random access channel (RACH) instances will be specially designated for use by mobile terminals that are in threshold poor coverage of the intended base station. Further, one or more other base stations that provide coverage overlapping, within, or near coverage of the intended base station will be arranged to monitor the one or more specially designated RACH instances for mobile terminal access requests, and upon detecting any such access request to forward the access request via an inter-base station link to the intended base station.

In this manner, when a mobile terminal is in threshold poor coverage of the intended base station and transmits an access request to the intended base station, another base station in the vicinity may effectively intercept the mobile terminal's access request transmission because the transmission occurred on a specially designated RACH instance, and may forward the access request to the intended base station, thereby helping to overcome the mobile terminal's uplink transmission power limitation discussed above. In turn, when the intended base station thereby receives the mobile terminal's access request forwarded by the other base station, the intended base station may respond directly to the mobile terminal via the intended base station's air interface, making use of the likely sufficient downlink transmission power.

The base stations at issue in this process can take any of a variety of forms. By way of example, the base station that the mobile terminal is trying to access could be a macro base station of the operated by a wireless carrier to provide a broad range of coverage and may thus include a tall antenna tower and a power amplifier for providing high transmission power. Whereas, each other base station could be a small cell base station ("small cell"), such as a femtocell, typically having a much smaller form factor and operating at lower transmission power for providing a smaller range of coverage. In such an arrangement, the mobile terminal may detect adequate but threshold poor coverage of the macro base station and transmit an access request to the macro base station on one of the specially designated RACH instances, and one of the small cells may intercept and forward that access request to the macro base station.

Further, in this example, this intercepting and forwarding could be entirely transparent to the mobile terminal, as the mobile terminal may not even be aware of the existence of the one or more small cells in the area. From the perspective of the mobile terminal, the mobile terminal would transmit an access request directly to the macro base station, and the mobile terminal would then receive an access response directly from the macro base station. However, regardless of whether the mobile terminal's access request transmission makes it directly to the macro base station, the access request transmission would advantageously be intercepted by the small cell forwarded from the small cell to the macro base station, thus helping to overcome the uplink transmission power limitation discussed above.

Accordingly, disclosed herein is a wireless communication system including a first base station (e.g., a macro base station) that provides wireless service on a first air interface, and a second base station (e.g., a small cell) that provides wireless service on a second air interface. In the disclosed system, the second air interface defines a plurality of mutually exclusive RACH instances for carrying random access requests from mobile terminals to the second base station, the plurality of RACH instances including one or more first RACH instances and one or more second RACH instances.

Further, the second base station is configured to differentially handle random access requests based on whether the second base station receives the requests on any of the one or more first RACH instances or rather on any of the one or more second RACH instances. In particular, the second base station is configured to process a random access request received on any of the one or more first RACH instances as a request to access the second base station rather than as a request to access the first base station. But the second base station is configured to instead automatically forward to the first base station a random access request received on any of the one or more second RACH instances, for processing of the random access request as a request to access the first base station rather than as request to access the second base station.

In addition, disclosed is a method operable by a cellular base station, such as one of the small cells noted above. In accordance with the method, the cellular base station provides wireless service on an air interface that defines a plurality of mutually exclusive RACH instances for carrying random access requests from mobile terminals to the cellular base station, the plurality of RACH instances including one or more first RACH instances and one or more second RACH instances.

Further, the cellular base station receives a random access request transmitted from a mobile terminal on a particular one of the plurality of RACH instances, and the cellular base station differentially handles the received random access request based on whether the particular RACH instance on which the random access request was transmitted is one of the one or more first RACH instances or rather one of the one or more second RACH instances. In particular, if the particular RACH instance is one of the one or more first RACH instances, then the cellular base station processes the random access request as a request to access the cellular base station and thus generates and transmits on the air interface a response to the random access request message. Whereas, if the particular RACH instance is instead one of the one or more second RACH instances, then the cellular base station automatically forwards the random access request via an inter-base station interface to another base station for processing by the other base station as a request to access the other base station rather than as a request to access the cellular base station.

Still additionally, disclosed is a method operable by a mobile terminal to facilitate the process discussed above. In accordance with the method, the mobile terminal detects coverage of a first base station, which provides wireless service on an air interface defining a plurality of mutually exclusive RACH instances for carrying random access requests to the first base station, the plurality of RACH instances including one or more first RACH instances and one or more second RACH instances. Further, the mobile terminal determines a quality of the detected coverage of the first base station, such as a received signal strength from the first base station or a signal to noise ratio from the first base station for instance.

The mobile terminal then selects, based on the determined quality of the detected coverage of the first base station, one of the plurality of RACH instances on which to transmit to a random access request seeking to access the first base station. In particular, the mobile terminal selects the RACH instance from the one or more first RACH instances if the determined quality is not threshold low, but the mobile terminal selects the RACH instance from the one or more second RACH instances if the determined quality is threshold low. In turn, the mobile terminal then transmits the random access request on the selected RACH instance.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
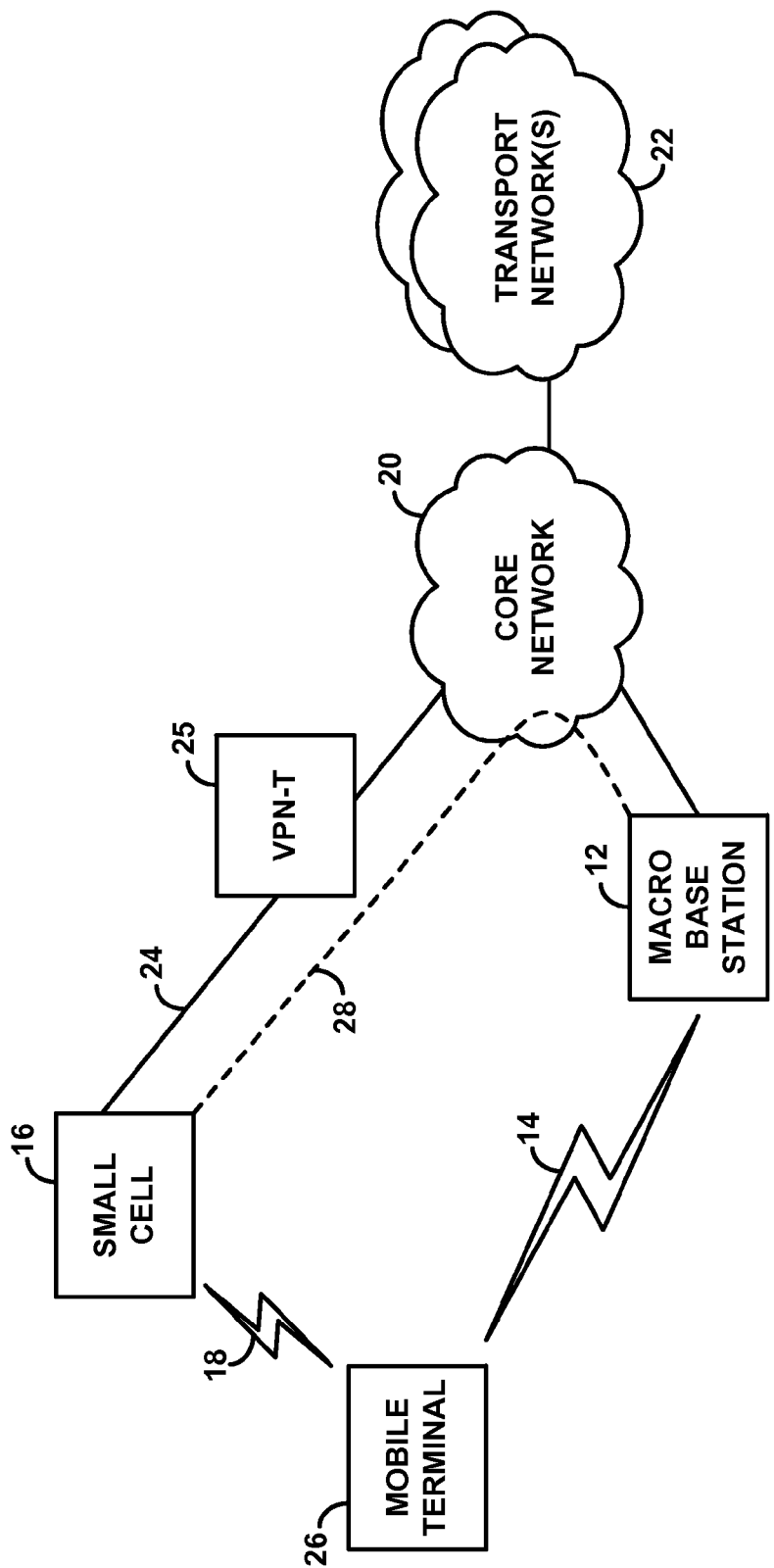
FIG. 1 is a simplified block diagram of a wireless communication system in which features of the present disclosure can be implemented.

The present disclosure will focus on an example implementation in a system where the intended base station is a macro base station and each of the one or more other base stations is a small cell such as a femtocell for instance. However, as noted above, the disclosed method and system can just as well apply with respect to any base stations, such as between two macro base stations, between two small cells, or in other arrangements. Further, even within the context of the disclosed implementation, numerous variations are possible.

For instance, various described machines, connections, functions, and other elements may be added, omitted, distributed, re-located, combined, or changed in other ways.

As noted above, FIG. 1 is a simplified block diagram of an example wireless communication system. As shown, the example system includes a macro base station 12 that radiates to define a first coverage area in which the macro base station provides wireless service over a first air interface 14. Further, the system includes an example small cell 16 that radiates to define a respective second coverage area in which the small cell provides wireless service over a second air interface 18. As shown, the macro base station sits on a wireless carrier's core network (e.g., packet-switched network) 20, which may include various supporting infrastructure, such as switches, gateways, mobility management entities, and the like, to provide connectivity with one or more transport networks 22 such as the PSTN and/or the Internet. Further, the small cell is shown coupled with a broadband connection 24 (such as the Internet) to a virtual private network (VPN) terminator 25 on the core network 20.

In line with the discussion above, the macro base station may be a base station of the type arranged to provide a broad range of coverage, and may thus include a tower-mounted antenna structure and power amplifier that facilitates transmission at a relatively high power level Further, the macro base station may broadcast a pilot or reference signal, to enable mobile terminals to detect and evaluate coverage of the macro base station.

The small cell, on the other hand, may be a femtocell or the like, having a much smaller form factor and being arranged for use in a smaller area, such as in a home, office, or campus, with a lower power transmitter for providing a smaller range of coverage. Further, the small cell may or may not broadcast a pilot or reference signal that enables mobile terminals to detect and evaluate coverage of the small cell. And if the small cell does broadcast such a pilot or reference signal, the small cell may generally be arranged to serve just particular mobile terminals, or may be arranged to serve mobile terminals in much the same way as the macro base station does. In practice, the wireless carrier that operates the macro base station may distribute small cells such as this to fill in gaps in coverage of the macro base station or for other reasons.

Further shown in the figure is a representative mobile terminal 26. The mobile terminal is depicted as being somewhat distant from the macro base station 12 but still within coverage of the macro base station, and further being somewhat close to the small cell 16. With this arrangement, the mobile terminal may detect adequate but poor coverage of the macro base station, such as a relatively weak but still sufficient pilot or reference signal strength or signal to noise ratio from the macro base station. In that scenario, the mobile terminal may deem coverage of the macro base station sufficient for the mobile terminal to request access, and thus the mobile terminal may transmit an access request to the macro base station.

In practice, the macro base station and small cell operate on the same air interface protocol as each other. Further, the macro base station and small cell may normally operate to provide wireless service on the same carrier frequency (e.g., frequency range) as each other. Alternatively, the macro eNodeB and small cell may normally operate to provide wireless service on different carrier frequencies than each other but the small cell may be additionally arranged to monitor designated RACH communications on the macro eNodeB's carrier frequency to facilitate the present method.

In the representative arrangement, the small cell 16 and macro base station may be configured to communicate with each other over an inter-base station interface 28. By way of example, this interface may be a logical connection between the small cell and the macro base station over the carrier's core network, through which the small cell and macro base station may exchange data by packet-switched communications or in another manner. Thus, through this inter-base station interface, for instance, the macro base station may transmit to the small cell a directive for the small cell to monitor one or more particular RACH instances and to forward to the macro base station any access requests the small cell detects on any such RACH instances. And through this inter-base station interface, the small cell may thus transmit to the macro base station any such detected access requests.

For simplicity, this disclosure will focus on the macro base station managing this process. However, in practice, one or more other entities on the macro network, such as a switch, controller, or mobility management entity for instance, could instead manage one or more aspects of the process. For instance, such another entity may be responsible for instructing the small cell to monitor one or more particular RACH instances and, upon detecting any access requests on any such RACH instance, to forward the access request to the macro base station.

Figure 2:
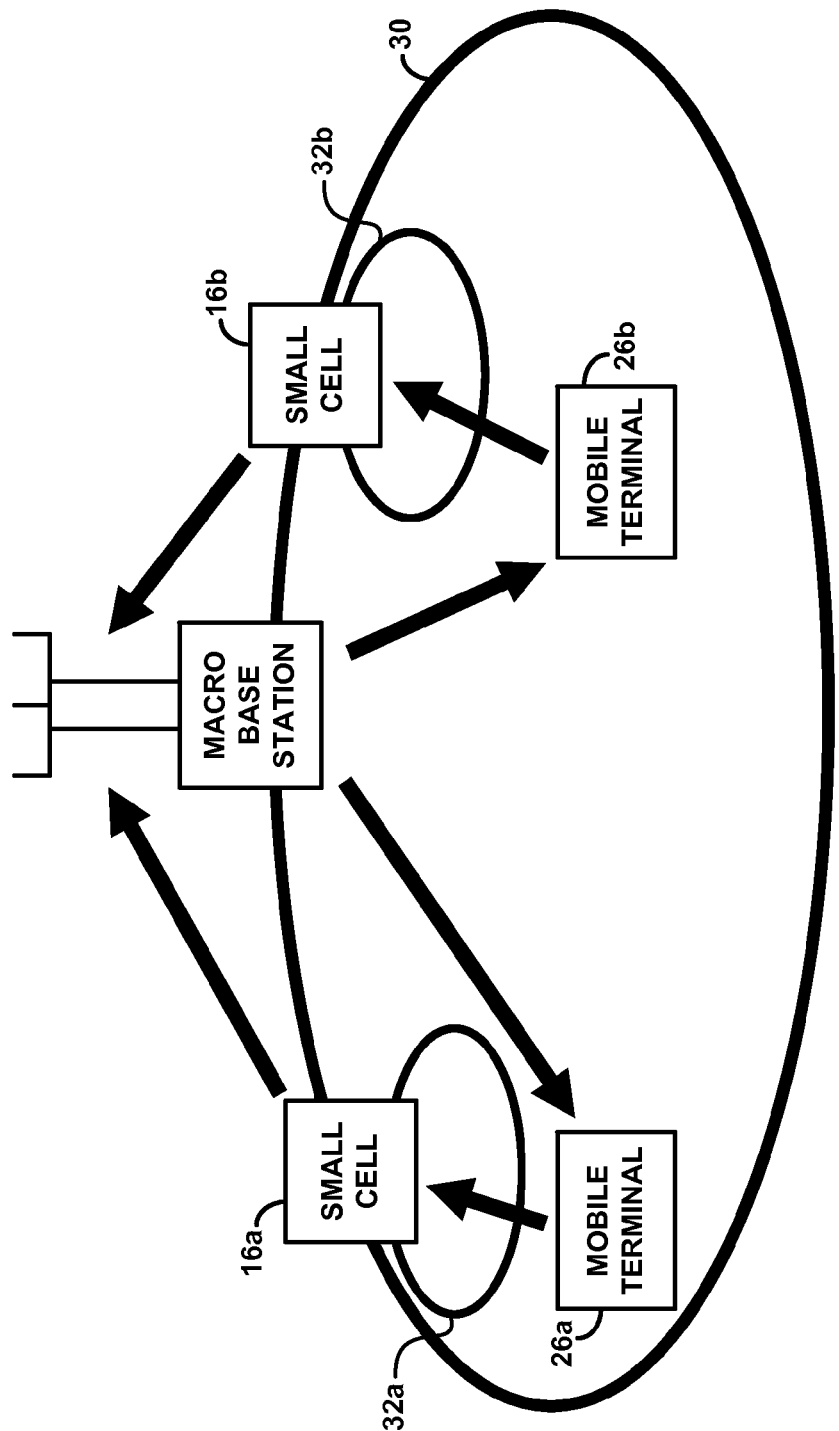
FIG. 2 is a further depiction of an arrangement like that of FIG. 1.

FIG. 2 is another depiction of an arrangement like that of FIG. 1, but showing by way of example two representative small cells 16a, 16b that each provide downlink coverage encompassed by downlink coverage of the macro base station, and depicting two representative mobile terminals 26a, 26b. In the arrangement shown, the macro base station provides a wide range of downlink coverage 30, and the small cells provide small ranges of downlink coverage 32a, 32b, each within the macro downlink coverage area 30. Mobile terminal 26a is then shown positioned at a far edge of the macro downlink coverage area 30 but somewhat close to small cell 16a, and mobile terminal 26b is shown generally in the macro downlink coverage area 30 and also somewhat close to small cell 16b.

With this arrangement, as shown, when either mobile terminal transmits an access request intended for the macro base station, a small cell near the mobile terminal may receive the access request and may forward the access request to the macro base station via an inter-base station interface. Further, upon receipt of the access request, the macro base station may then transmit an access response directly to the mobile terminal via the macro base station's downlink. This arrangement may thus help to overcome the difficulty that could arise from a mobile terminal having limited uplink transmission power.

In a representative system as discussed above, one or more particular RACH instances may be designated for use by mobile terminals that are in threshold poor coverage of the macro base station, and each of one or more small cells may be arranged to monitor the one or more particular RACH instances and, upon detecting an access request on any such RACH instance, to forward the access request via an inter-base station interface to the macro base station.

The RACH instances at issue in this process can take any of a variety of forms, depending on the air interface protocol and various other factors.

By way of example, in a CDMA system, each of various base station coverage areas includes one or more time-slotted access channels on which mobile terminals can transmit access probes defining access requests. In that scenario, the RACH instances could be particular ones of the access channels and/or particular timeslots on one or more such access channels.

In an LTE system, on the other hand, each of various base station coverage areas defines a continuum of periodically recurring frames (e.g., each 10 milliseconds long), each divided into a number of subframes (e.g., each 1 millisecond long) having two slots (e.g., each 0.5 millisecond long), and each slot then defines a sequence of physical resource blocks (e.g., each 180 kHz wide) cooperatively spanning the base station's channel bandwidth. In that scenario, RACH instances could be particular groups of physical resource blocks, such as designated groups of six physical resource blocks each, on which mobile terminals can transmit RACH access preambles. Thus, a given LTE RACH instance could be defined as being a particular group of six resource blocks in a particular subframe, and that RACH instance may recur every 10 milliseconds.

In practice, each of the base stations in the wireless communication system may designate certain RACH instances for normal use by mobile terminals seeking to access the base station. For instance, each base station may broadcast in its coverage area a system information message that designates the RACH instances that are available for use to carry access requests from mobile terminals. In CDMA, this system information message may be an access parameters message. Whereas, in LTE, this system information message may be a system information block (SIB) such as SIB2 for instance. A mobile terminal in coverage of a given base station may thus read that system information message to determine what RACH instances are defined for use to transmit access requests to the base station, and the mobile terminal may then transmit an access request to the base station on one such RACH instance.

In accordance with the present method, the macro base station 12 may also designate one or more particular RACH instances as special RACH instances for use by any mobile terminal that is in threshold poor coverage of the macro base station. And the macro base station may direct the small cell 16 to monitor those particular RACH instances for any access requests and, upon detecting an access request on any such RACH instance, to forward the access request to the macro base station.

The one or more RACH instances that the macro base station designates for this purpose may be RACH instances of those that the macro base station designates for normal use by any mobile terminal seeking to access the macro base station. Thus, if the macro base station normally defines six RACH instances per frame, the macro base station might designate one or two of those six RACH instances as the special RACH instances for use by mobile terminals in poor coverage of the macro base station, and the macro base station may instruct the small cell to monitor those two particular RACH instances and to detect and forward access requests as discussed above. In this way, when a mobile terminal that is seeking to access the macro base station transmits an access request on one of the specially designated RACH instances, there is still a chance that the macro base station itself may directly receive that access request on that RACH instance, in addition to the small cell intercepting and forwarding the access request to the macro base station. Further, such RACH instances may those be open for use by any mobile terminal seeking to access the macro base station, possibly regardless of detected coverage quality.

Alternatively, the RACH instances may be RACH instances supplemental to the RACH instances that the macro base station designates for normal use by any mobile terminal seeking to access the macro base station. For instance, if the macro base station normally defines six RACH instances for use by any mobile terminal seeking to access the macro base station, the macro base station may additionally define some number of special RACH instances specifically for use by mobile terminals in threshold poor coverage of the macro base station. Thus, if a mobile terminal determines that it is not within threshold poor coverage of the macro base station, then the mobile terminal may responsively opt to use one of the six normally defined RACH instances. Whereas if a mobile terminal determines that it is within threshold poor coverage of the macro base station, then the mobile terminal may responsively opt to use one of the supplemental, special RACH instances.

Further, the one or more RACH instances that that the small cell thus monitors for this purpose may be RACH instances supplemental to the RACH instances that the small cell designates for normal use by any mobile terminal seeking to access the small cell, and the small cell may then differentially handle access requests depending on which RACH instance they arrive on. For instance, if the small cell normally defines five RACH instances, and two special RACH instances are designated for the present method, the small cell may be arranged to monitor all seven RACH instances and (i) to process as a request to access the small cell any access request received on one of the normal five RACH instances but (ii) to forward to the macro base station any access request received on one of the specially designated other two RACH instances.

In addition, certain special RACH instances may be designated for use depending on the level of macro base station coverage quality detected by the mobile terminal at issue. For instance, one or more special RACH instances may be designated for use by mobile terminals seeking to access the macro base station but having downlink signal strength or signal to noise ratio in a particularly low designated range, whereas one or more other special RACH instances may be designated for use by mobile terminals seeking to access the macro base station but having downlink signal strength or signal to noise ratio in a somewhat higher but perhaps still low designated range, and so forth.

This additional arrangement may be useful in a scenario where the network has data indicating locations of various small cells (e.g., provided during small cell registration) and data indicating typical ranges of downlink signal strength or signal to noise ratio corresponding with mobile terminal location (e.g., provided as measurement reports from mobile terminals or through drive testing). In that case, each set of one or more special RACH instances for use by mobile terminals having a particular range of downlink signal strength or signal to noise ratio could be correlated with one or more particular small cells located around where mobile terminals tend to detect downlink signal strength or signal to noise ratio in that range. And such one or more particular small cells could be directed to monitor such one or more special RACH instances and to intercept and forward access requests detected on any such RACH instances. Consequently, this arrangement could help optimize operation by having appropriately located small cells intercept and forward access requests from mobile terminals that are more likely in their range.

In accordance with the method, the macro base station may broadcast a specification of the one or more specially designated RACH instances in correspondence with a coverage quality range such as range of downlink signal strength or signal to noise ratio (e.g., a range, or "lower than" a particular level) at which mobile terminals should use any of the one or more specially designated RACH instances for transmitting access requests. Further, such a specification may provide for multiple correlations between coverage quality and sets of one or more specially designated RACH instances in line with the additional arrangement discussed above.

In addition, the macro base station or another network entity may transmit to each small cell a directive for the small cell to operate as discussed above with respect to the specially designated RACH instances at issue. Such a directive may take any form, provided that the small cell is arranged to receive and respond to the directive in the manner described by way of example.

Figure 3:
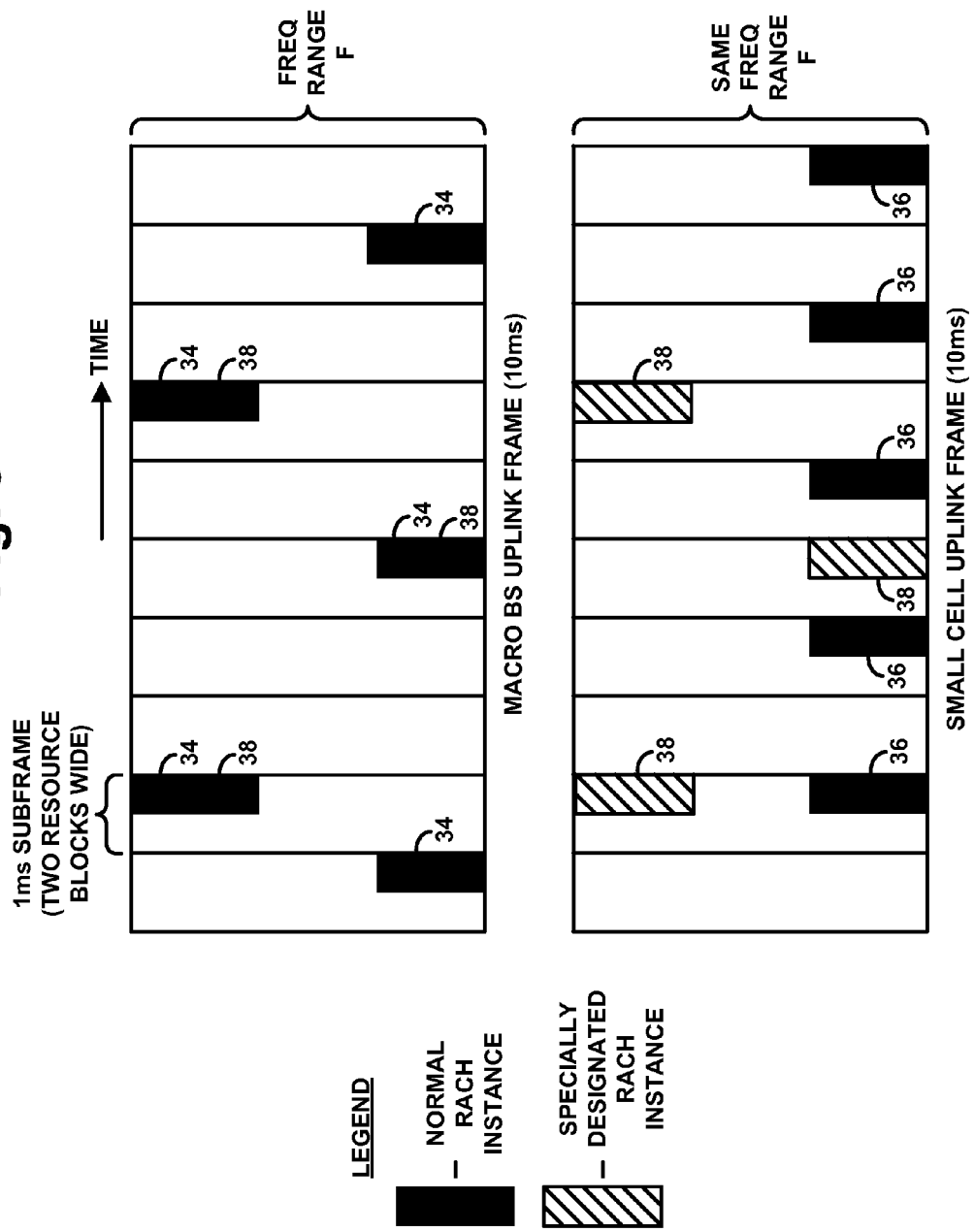
FIG. 3 is a an illustration of example RACH instances.

FIG. 3 is an illustration of how these RACH instances may be arranged in a representative LTE implementation by way of example. In particular, the figure depicts time aligned representations of uplink frames on the macro base station's air interface and the small cell's air interface. As shown, each frame includes ten 1 millisecond subframes divided into two timeslots that define resource blocks spanning a channel bandwidth (with only a portion of the bandwidth being shown for simplicity). The arrangement shown is intentionally simplified for ease of illustration.

In the example arrangement of FIG. 3, the macro base station air interface defines five RACH instances 34 for normal use by mobile terminals seeking to access the macro base station, and the small cell air interface defines five different RACH instances 36 for normal use by mobile terminals seeking to access the small cell. Further, three of the normally defined RACH instances of the macro base station air interface are designated as special RACH instances 38 to be used by any mobile terminal that is in threshold poor coverage of the macro base station. And the small cell is arranged to monitor those two RACH instances and, upon detecting an access request in any such RACH instance, to forward it to the macro base station.

This arrangement illustrates two examples of how these special RACH instances can be provided with respect to the small cell's air interface. As shown, in one example, at least one of the specially designated RACH instances could be provided in the same subframe where the small cell normally defines a RACH instance for use by mobile terminals seeking to access the small cell. The specially designated RACH instance would just be defined as residing on a mutually exclusive set of resource blocks, separate from those defining the normal RACH instance in that subframe. And in another example, at least one of the specially designated RACH instances could be provided in a subframe in which the small cell does not have a normal RACH instance defined. Other example arrangements are possible as well.

In sum, generalizing the arrangement discussed above, a wireless communication system may thus include a first base station (e.g., a macro base station, such as an LTE evolved node B (eNodeB)) that provides wireless service on a first air interface, and a second base station (e.g., a small cell, possibly also an LTE eNodeB) that provides wireless service on a second air interface. Further, the second air interface may define a plurality of mutually exclusive RACH instances for carrying random access requests from mobile terminals to the second base station, the plurality of RACH instances including one or more first RACH instances (e.g., normally defined for accessing the small cell) and one or more second RACH instances (e.g., supplemental RACH instances defined to facilitate the present method). And the first air interface may also define the at least one or more second RACH instances.

In line with the discussion above, an example of the second air interface may define periodically recurring frames each having a plurality of subframes, and the one or more second RACH instances could include a second RACH instance defined in the same subframe as one of the first RACH instances but on different resources of that same subframe, such as on a different set of resource blocks. Alternatively or additionally, the one or more second RACH instances could include a second RACH instance defined in a subframe in which the second air interface does not define any of the one or more first RACH instances. Moreover, each of the plurality of RACH instances may distinguished from each other of the RACH instances by one or more characteristics, such as time, frequency, and/or orthogonal coding.

In this arrangement, as discussed above, the second base station may differentially handle random access requests based on whether the second base station receives the requests on any of the one or more first RACH instances or rather on any of the one or more second RACH instances. In particular, the second base station may process a random access request received on any of the one or more first RACH instances as a request to access the second base station rather than as a request to access the first base station. Whereas, the second base station may instead automatically forward to the first base station a random access request received on any of the one or more second RACH instances, for processing of the random access request as a request to access the first base station rather than as request to access the second base station. And in a representative implementation, the second base station would not transmit to the mobile terminal a response to the mobile terminal's access request.

Further, when the second base station automatically forwards to the first base station a mobile station's random access request that the second base station received on any of the one or more second RACH instances of the second air interface, the first base station may receive the forwarded random access request and may then transmit, on the first air interface rather than on the second air interface, a response to the mobile terminal's random access request. Thus, from the mobile terminal's perspective, it may seem as though the mobile terminal transmitted an access request directly to the first base station and then received an access response directly from the first base station, when in fact the mobile station's access request would have been intercepted and forward by the second base station to the first base station.

In line with the discussion above, the mobile terminal in this arrangement may opt to transmit its random access request on one of the one or more second RACH instances in particular, based at least in part on an evaluation of downlink signal strength from the first base station to the mobile terminal. (In practice, the mobile terminal may decide to do this in response to the mobile terminal detecting threshold low signal strength from the first base station. Alternatively, the first base station may specifically direct the mobile terminal to do so in response to receipt from the mobile terminal of a report indicating that the mobile terminal has detected threshold low downlink signal strength from the first base station.)

Further, as noted above, the first base station may broadcast a system information message that specifies the one or more second RACH instances on which mobile terminals that detect the threshold low signal strength from the first base station are to transmit random access requests.

Figure 4:
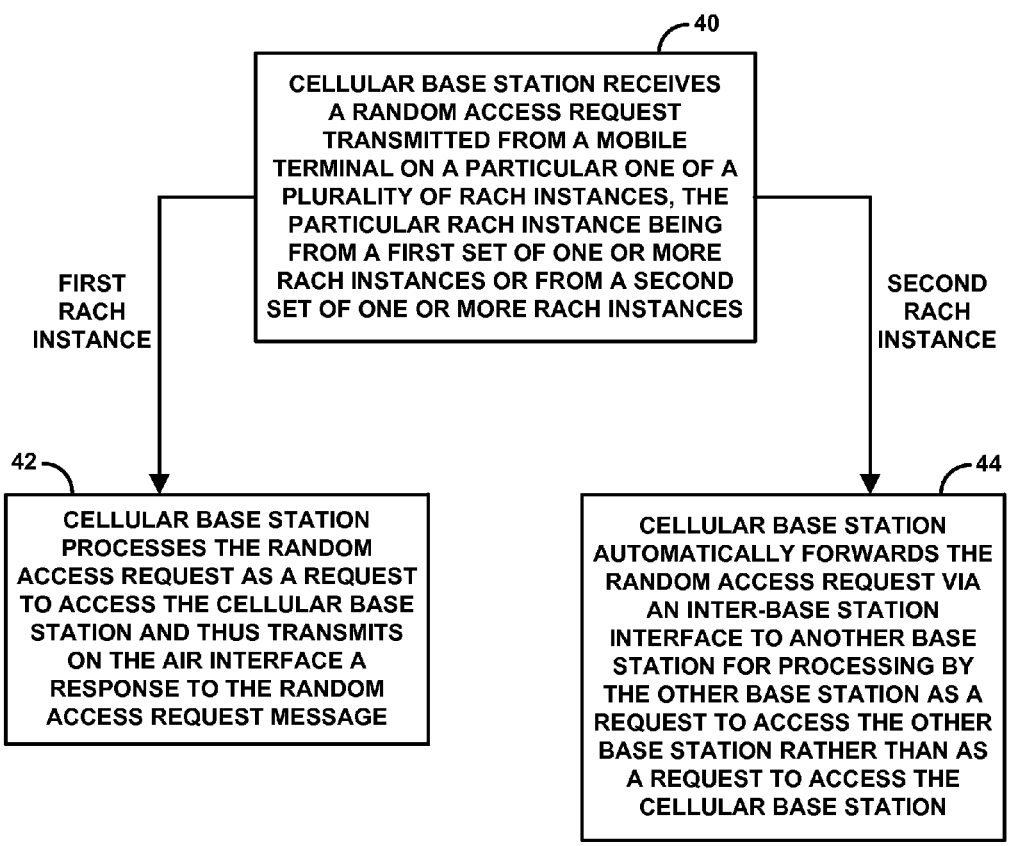
FIG. 4 is a flow chart depicting functions that can be carried out in accordance with the present disclosure.

FIG. 4 is next a flow chart depicting example functions that can be carried out by a cellular base station (e.g., a small cell or generally a "second base station" in the above discussion) in accordance with the present disclosure. In line with the discussion above, the cellular base station may provide wireless service on an air interface defining a plurality of mutually exclusive RACH instances for carrying random access requests from mobile terminals to the cellular base station, the plurality of RACH instances including one or more first RACH instances and one or more second RACH instances.

As shown in FIG. 4, at block 40, the cellular base station receives a random access request transmitted from a mobile terminal on a particular one of the plurality of RACH instances. And at blocks 42 and 44, the cellular base station then differentially handles the received random access request based on whether the particular RACH instance on which the random access request was transmitted (or correspondingly received) is one of the one or more first RACH instances or rather one of the one or more second RACH instances. In particular, if the particular RACH instance is one of the one or more first RACH instances, then, at block 42, the cellular base station processes the random access request as a request to access the cellular base station and thus transmits on the air interface a response to the random access request message. Whereas, if the particular RACH instance is instead one of the one or more second RACH instances, then, at block 44, the cellular base station automatically forwards the random access request via an inter-base station interface to another base station for processing by the other base station as a request to access the other base station rather than as a request to access the cellular base station.

In line with the discussion above, the air interface in this method may define recurring frames each having a plurality of subframes, and at least a given one of the subframes may include at least one of the one or more first RACH instances and at least one of the one or more second RACH instances. Further, the cellular base station may broadcast a system information message that specifies as available RACH instances the one or more first RACH instances but does not specify as available RACH instances the one or more second RACH instances.

Figure 5:
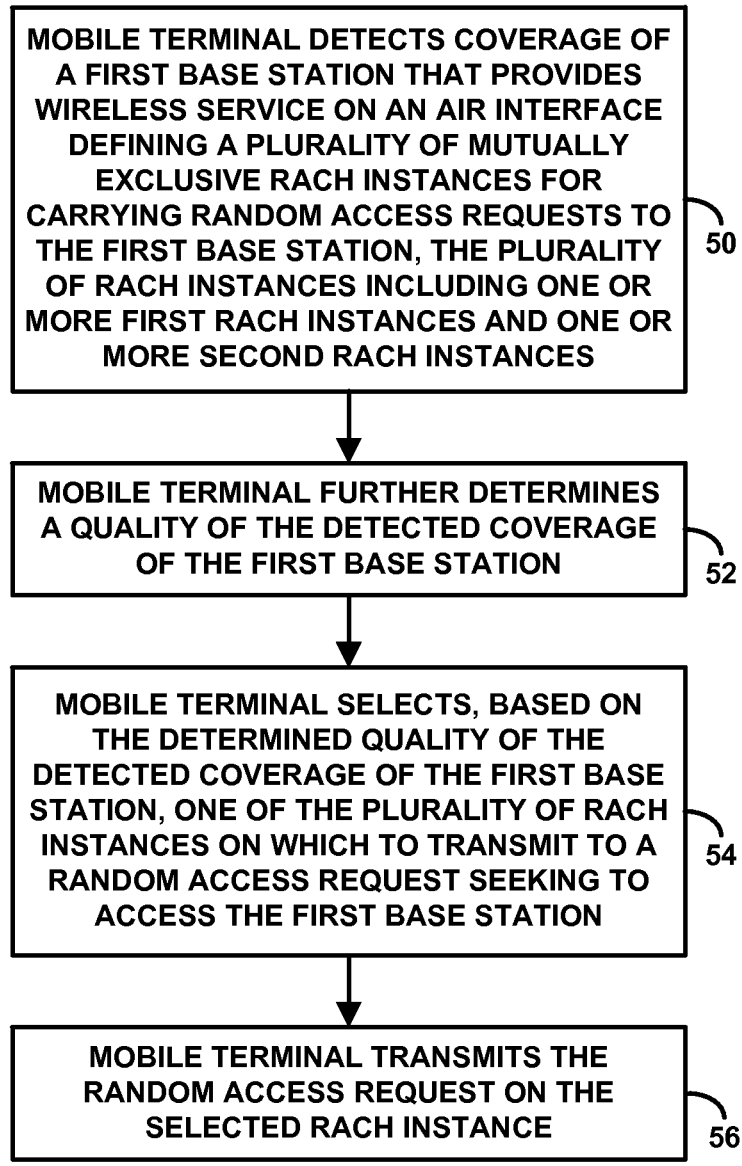
FIG. 5 is another flow chart depicting functions that can be carried out in accordance with the present disclosure.

FIG. 5 is a flow chart depicting another example set of functions that can be carried out in accordance with the present disclosure. As shown in FIG. 5, at block 50, a mobile terminal may detect coverage of a first base station that provides wireless service on an air interface defining a plurality of mutually exclusive RACH instances for carrying random access requests to the first base station, the plurality of RACH instances including one or more first RACH instances and one or more second RACH instances. At block 52, the mobile terminal may further determine a quality of the detected coverage of the first base station, such as a downlink signal strength or signal to noise ratio.

At block 54, the mobile terminal may then select, based on the determined quality of the detected coverage of the first base station, one of the plurality of RACH instances on which to transmit to a random access request seeking to access the first base station. In particular, the mobile terminal may select the RACH instance from the one or more first RACH instances if the determined quality is not threshold low, but the mobile terminal may instead select the RACH instance from the one or more second RACH instances if the determined quality is threshold low. And at block 56, the mobile terminal may then transmit the random access request on the selected RACH instance.

In line with the discussion above, this method may then further involve a second base station providing wireless service on a second air interface that also defines the at least one or more second RACH instances. That way, in a scenario where the selected RACH instance is one of the one or more second RACH instances, the second base station may intercept the transmitted random access request transmit on the selected one of the one or more second RACH instances, and the second base station may automatically forward to the first base station the received random access request, because the RACH instance on which the random access request was transmitted was one of the one or more second RACH instances.

Note also that, in a further enhancement of the advance described above, the first base station may also arrange with the second base station for the second base station to intercept and forward to the first base station other communications transmitted by the mobile terminal on the uplink to the first base station. For instance, once the mobile terminal has a radio link connection with the first base station, the first base station may transmit directly to the mobile terminal a scheduling directive instructing the mobile terminal to transmit data on certain uplink resources, such as certain uplink LTE resource blocks to the first base station. And the first base station may also transmit to the second base station a directive for the second base station to monitor such resources and, upon detecting communications on such resources, to forward the communications to the first base station. This can be done in addition to the innovative processing of access requests discussed above.

Finally, it will be understood that the base stations and mobile terminal described herein can include components typical of such entities, along with control logic to facilitate carrying out the functions described.

For instance, each base station may include an antenna structure, power amplifier, and transceiver, for communicating over its respective air interface, as well as a backhaul interface for communicating on the core network or establishing other network connectivity. Further, the first base station (e.g., macro base station) may include a processing unit programmed to cause the first base station (i) to broadcast an indication of one or more specially defined RACH instances and correspondence with one or more ranges of downlink coverage quality, (ii) to direct the second base station to operate as discussed above, (iii) to receive a mobile terminal's access request forwarded as discussed above, and (iv) to respond directly to the mobile terminals. And the second base station (e.g., small cell) may include a processing unit programmed to cause the second base station (i) to receive and respond to the first base station's directive, (ii) to monitor the one or more specially defined RACH instances, and (ii) upon detecting an access request in any such RACH instance, to forward the access request to the first base station.

Further, the mobile terminal may include an antenna structure, power amplifier, and transceiver, for communicating with various base stations as discussed above and may include a processing unit programmed to carry out the mobile terminal functions described above.

Exemplary embodiments have been described above. Those skilled in the art will understand, however, that changes and modifications may be made to these embodiments without departing from the true scope and spirit of the invention.

We claim:

1. A wireless communication system comprising:
   a first base station providing wireless service on a first air interface; and
   a second base station providing wireless service on a second air interface, the second air interface defining a plurality of mutually exclusive random access channel (RACH) instances for carrying random access requests from mobile terminals to the second base station, the plurality of RACH instances including one or more first RACH instances and one or more second RACH instances,
   wherein the second base station differentially handles random access requests based on whether the second base station receives the requests on any of the one or more first RACH instances or on any of the one or more second RACH instances, wherein (i) the second base station processes a random access request received on any of the one or more first RACH instances as a request to access the second base station rather than as a request to access the first base station, and (ii) the second base station automatically forwards to the first base station a random access request received on any of the one or more second RACH instances, for processing of the random access request as a request to access the first base station rather than as request to access the second base station.

2. The wireless communication system of claim 1, wherein, when the second base station automatically forwards to the first base station a mobile station's random access request that the second base station received on any of the one or more second RACH instances of the second air interface, the first base station receives the forwarded random access request and transmits, on the first air interface rather than on the second air interface, a response to the mobile terminal's random access request.

3. The wireless communication system of claim 2, wherein the mobile terminal transmits the mobile terminal's random access request on one of the one or more second RACH instances based at least in part on an evaluation of downlink signal strength from the first base station to the mobile terminal.

4. The wireless communication system of claim 3, wherein the mobile terminal transmits the mobile terminal's random access request on one of the one or more second RACH instances in response to the mobile terminal detecting threshold low signal strength from the first base station.

5. The wireless communication system of claim 4, wherein the first base station broadcasts a system information message that specifies the one or more second RACH instances on which mobile terminals that detect the threshold low signal strength from the first base station are to transmit random access requests.

6. The wireless communication system of claim 2, wherein the second base station does not transmit to the mobile terminal a response to the mobile terminal's random access request.

7. The wireless communication system of claim 1, wherein the first air interface also defines at least the one or more second RACH instances.

8. The wireless communication system of claim 1, wherein the plurality of RACH instances are periodically recurring.

9. The wireless communication system of claim 1, wherein the second air interface defines periodically recurring frames each having a plurality of subframes, and wherein the one or more second RACH instances includes a second RACH instance defined in a same subframe as one of the first RACH instances but on different resources of that same subframe.

10. The wireless communication system of claim 1, wherein the second air interface defines periodically recurring frames each having a plurality of subframes, and wherein the one or more second RACH instances includes a second RACH instance defined in a subframe in which the second air interface does not define any of the one or more first RACH instances.

11. The wireless communication system of claim 1, wherein each of the plurality of RACH instances is distinguished from each other of the RACH instances by at least one characteristic selected from the group consisting of time, frequency, and orthogonal coding.

12. The wireless communication system of claim 1, wherein the first base station is a macro base station, and wherein the second base station is a small cell base station that provides coverage within coverage of the macro base station.

13. The wireless communication system of claim 1, wherein the first base station is a Long Term Evolution (LTE) evolved Node B (eNodeB), and wherein the second base station is also an LTE eNodeB.

14. The wireless communication system of claim 1, wherein automatically forwarding the random access request to the first base station comprises automatically transmitting the random access request over an inter-base station interface to the second base station.

15. The wireless communication system of claim 1, wherein the first air interface also defines a plurality of RACH instances for receiving random access requests directly from mobile terminals.

16. A method comprising:
providing, by a cellular base station, wireless service on an air interface defining a plurality of mutually exclusive random access channel (RACH) instances for carrying random access requests from mobile terminals to the cellular base station, the plurality of RACH instances including one or more first RACH instances and one or more second RACH instances;
receiving, by the cellular base station, a random access request transmitted from a mobile terminal on a particular one of the plurality of RACH instances; and
differentially handling the received random access request, by the cellular base station, based on whether the particular RACH instance on which the random access request was transmitted is one of the one or more first RACH instances or rather one of the one or more second RACH instances,
wherein differentially handling the received random access request comprises (i) if the particular RACH instance is one of the one or more first RACH instances, then processing the random access request as a request to access the cellular base station and thus transmitting by the cellular base station on the air interface a response to the random access request message, whereas (ii) if the particular RACH instance is instead one of the one or more second RACH instances, then automatically forwarding the random access request via an inter-base station interface to another base station for processing by the other base station as a request to access the other base station rather than as a request to access the cellular base station.

17. The method of claim 16, wherein the air interface defines recurring frames each having a plurality of subframes, wherein at least a given one of the subframes includes at least one of the one or more first RACH instances and at least one of the one or more second RACH instances.

18. The method of claim 17, further comprising broadcasting by the cellular base station a system information message that specifies as available RACH instances the one or more first RACH instances but that does not specify as available RACH instances the one or more second RACH instances.

19. A method comprising:
detecting, by a mobile terminal, coverage of a first base station, wherein the first base station provides wireless service on an air interface defining a plurality of mutually exclusive random access channel (RACH) instances for carrying random access requests to the first base station, the plurality of RACH instances including one or more first RACH instances and one or more second RACH instances;
determining, by the mobile terminal, a quality of the detected coverage of the first base station;
selecting, by the mobile terminal, based on the determined quality of the detected coverage of the first base station, one of the plurality of RACH instances on which to transmit to a random access request seeking to access the first base station, wherein the mobile terminal selects the RACH instance from the one or more first RACH instances if the determined quality is not threshold low, but the mobile terminal selects the RACH instance from the one or more second RACH instances if the determined quality is threshold low; and transmitting, by the mobile terminal, the random access request on the selected RACH instance, wherein, when the selected RACH instance is one of the one or more second RACH instances, a second base station that provides wireless service on a second air interface also defining at least one of the one or more second RACH instances (i) intercepts the transmitted random access request and (ii) automatically forwards to the first base station the random access request because the RACH instance on which the random access request was transmitted was one of the one or more second RACH instances.

* * * * *